(12) United States Patent
Shinya et al.

(10) Patent No.: US 12,321,056 B2
(45) Date of Patent: *Jun. 3, 2025

(54) RESIN COMPOSITION AND DISPLAY UNIT

(71) Applicant: DEXERIALS CORPORATION, Shimotsuke (JP)

(72) Inventors: Yoshihisa Shinya, Utsunomiya (JP); Yusuke Kamata, Utsunomiya (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/629,671

(22) Filed: Apr. 8, 2024

(65) Prior Publication Data
US 2024/0255790 A1    Aug. 1, 2024

Related U.S. Application Data

(60) Division of application No. 17/941,847, filed on Sep. 9, 2022, now Pat. No. 11,982,890, which is a (Continued)

(30) Foreign Application Priority Data

Jul. 14, 2006    (JP) .................. 2006-193730
Apr. 9, 2007    (JP) .................. 2007-102251

(51) Int. Cl.
*G02F 1/1333*    (2006.01)
*C08F 290/06*    (2006.01)
(Continued)

(52) U.S. Cl.
CPC ...... *G02F 1/133308* (2013.01); *C08F 290/06* (2013.01); *C08F 290/067* (2013.01);
(Continued)

(58) Field of Classification Search
CPC ............. G02F 1/133331; G02F 1/1333; G02F 1/13309; G02F 2201/503
See application file for complete search history.

(56) References Cited

U.S. PATENT DOCUMENTS 4,679,918 A    7/1987 Ace
5,073,477 A    12/1991 Kusuda et al.
(Continued)

FOREIGN PATENT DOCUMENTS

CN    1152330 A    6/1997
CN    1502048 A    6/2004
(Continued)

OTHER PUBLICATIONS

Jul. 17, 2024 Notice of Allowance issued in U.S. Appl. No. 18/224,329.
(Continued)

*Primary Examiner* — Jessica M Merlin
(74) *Attorney, Agent, or Firm* — Oliff PLC

(57) ABSTRACT

A display unit that includes an image display part and a light-transmitting protective part arranged on the image display part. A cured resin layer is arranged between the display part and the protective part. The cured resin layer can have a transmittance of 90% or higher in the visible range and a storage modulus at 25° C. of $1\times10^7$ Pa or less. The cured resin layer can be formed from a resin composition that has a cure shrinkage of 5% or less.

5 Claims, 2 Drawing Sheets

Related U.S. Application Data continuation of application No. 17/199,913, filed on Mar. 12, 2021, now Pat. No. 11,467,438, which is a continuation of application No. 16/868,012, filed on May 6, 2020, now Pat. No. 10,989,944, which is a continuation of application No. 15/857,018, filed on Dec. 28, 2017, now Pat. No. 10,684,498, which is a division of application No. 15/415,386, filed on Jan. 25, 2017, now Pat. No. 9,885,900, which is a division of application No. 14/331,660, filed on Jul. 15, 2014, now Pat. No. 9,599,847, which is a continuation of application No. 12/308,858, filed as application No. PCT/JP2007/064120 on Jul. 17, 2007, now Pat. No. 9,423,638.

(51) Int. Cl.

| | | |
|---|---|---|
| *C08L 9/00* | (2006.01) | |
| *C08L 19/00* | (2006.01) | |
| *C08L 45/00* | (2006.01) | |
| *C08L 51/04* | (2006.01) | |
| *C09J 109/00* | (2006.01) | |
| *C09J 133/06* | (2006.01) | |
| *G02F 1/1335* | (2006.01) | |

(52) U.S. Cl.
CPC ............... *C08L 9/00* (2013.01); *C09J 109/00* (2013.01); *C09J 133/066* (2013.01); *G02F 1/1333* (2013.01); *G02F 1/133528* (2013.01); *C08L 19/006* (2013.01); *C08L 45/00* (2013.01); *C08L 51/04* (2013.01); *C08L 2203/206* (2013.01); *C08L 2666/02* (2013.01); *G02F 1/133331* (2021.01); *G02F 2201/50* (2013.01); *G02F 2201/503* (2013.01); *G02F 2202/022* (2013.01); *G02F 2202/28* (2013.01); *Y10T 428/24355* (2015.01); *Y10T 428/31504* (2015.04)

(56) References Cited

U.S. PATENT DOCUMENTS

| | | |
|---|---|---|
| 5,126,620 A | 6/1992 | Haraga et al. |
| 5,557,436 A | 9/1996 | Blose et al. |
| 5,679,722 A | 10/1997 | Tamura |
| 5,926,248 A | 7/1999 | Tucker |
| 5,976,297 A | 11/1999 | Oka et al. |
| 6,204,896 B1 | 3/2001 | Matsuhira et al. |
| 6,218,446 B1 | 4/2001 | Arnold et al. |
| 6,287,745 B1 | 9/2001 | Yamamura et al. |
| 6,383,558 B1 | 5/2002 | Fujiwara et al. |
| 6,414,781 B1 | 7/2002 | Saitoh |
| 6,458,467 B1 | 10/2002 | Mizuno et al. |
| 6,461,709 B1 | 10/2002 | Janssen et al. |
| 6,654,083 B1 | 11/2003 | Toda et al. |
| 6,673,850 B1 | 1/2004 | Yamato et al. |
| 6,950,236 B2 | 9/2005 | Hokazono et al. |
| 7,382,422 B2 | 6/2008 | Niiyama et al. |
| 7,499,130 B2 | 3/2009 | Tsai et al. |
| 7,830,595 B2 | 11/2010 | Hinata et al. |
| 7,910,033 B2 | 3/2011 | Kamata et al. |
| 7,927,533 B2 | 4/2011 | Kamiya et al. |
| 7,982,826 B2 | 7/2011 | Hirakata et al. |
| 8,773,624 B2 | 7/2014 | Shinya et al. |
| 8,859,633 B2 | 10/2014 | Oshima et al. |
| 9,423,638 B2 | 8/2016 | Shinya et al. |
| 9,599,847 B2 * | 3/2017 | Shinya ................... C09J 109/00 |
| 9,885,900 B2 | 2/2018 | Shinya et al. |
| 10,216,026 B2 | 2/2019 | Shinya et al. |
| 10,684,498 B2 | 6/2020 | Shinya et al. |
| 10,725,329 B2 | 7/2020 | Shinya et al. |
| 10,989,944 B2 | 4/2021 | Shinya et al. |
| 11,237,423 B2 | 2/2022 | Shinya et al. |
| 11,467,438 B2 | 10/2022 | Shinya et al. |
| 2001/0003031 A1 | 6/2001 | Tamura et al. |
| 2001/0039326 A1 | 11/2001 | Misumi et al. |
| 2002/0018163 A1 | 2/2002 | Yamamoto et al. |
| 2002/0048717 A1 | 4/2002 | Yamamura et al. |
| 2002/0118323 A1 | 8/2002 | Itou et al. |
| 2002/0131141 A1 | 9/2002 | Saitoh |
| 2002/0154254 A1 | 10/2002 | Tasaki et al. |
| 2002/0191287 A1 | 12/2002 | Miyazawa et al. |
| 2003/0006704 A1 | 1/2003 | Morimoto et al. |
| 2003/0069323 A1 | 4/2003 | Varlemann et al. |
| 2003/0087054 A1 | 5/2003 | Janssen et al. |
| 2003/0118922 A1 | 6/2003 | Hayashi et al. |
| 2003/0137630 A1 | 7/2003 | Niiya |
| 2003/0199601 A1 | 10/2003 | Chang et al. |
| 2004/0180148 A1 | 9/2004 | Hieda et al. |
| 2004/0192804 A1 | 9/2004 | Kura et al. |
| 2005/0083465 A1 | 4/2005 | Niiyama et al. |
| 2005/0126697 A1 | 6/2005 | Kuczynski |
| 2005/0172891 A1 | 8/2005 | Suzuki et al. |
| 2005/0190335 A1 | 9/2005 | Maruyama et al. |
| 2005/0249683 A1 | 11/2005 | L'Alloret |
| 2005/0249932 A1 | 11/2005 | Wang et al. |
| 2006/0062938 A1 | 3/2006 | Takeko et al. |
| 2006/0108050 A1 | 5/2006 | Satake et al. |
| 2006/0110549 A1 | 5/2006 | Wang et al. |
| 2006/0128856 A1 | 6/2006 | Takahashi et al. |
| 2006/0158602 A1 | 7/2006 | Toyoda |
| 2006/0159867 A1 | 7/2006 | O'Donnell |
| 2006/0222809 A1 | 10/2006 | Yamada et al. |
| 2006/0229376 A1 | 10/2006 | Hayashi et al. |
| 2006/0234074 A1 | 10/2006 | Yun et al. |
| 2006/0235101 A1 | 10/2006 | Messe |
| 2006/0271771 A1 | 11/2006 | Cartony et al. |
| 2006/0272771 A1 | 12/2006 | Suzuki et al. |
| 2006/0272774 A1 | 12/2006 | Maehara et al. |
| 2006/0279923 A1 | 12/2006 | Kim et al. |
| 2006/0292378 A1 | 12/2006 | Mgaya et al. |
| 2007/0046874 A1 | 3/2007 | Adachi et al. |
| 2007/0065091 A1 | 3/2007 | Hinata et al. |
| 2007/0133225 A1 | 6/2007 | Sakai |
| 2007/0141244 A1 | 6/2007 | Bell et al. |
| 2007/0202933 A1 | 8/2007 | Tolbert et al. |
| 2007/0222911 A1 | 9/2007 | Murase |
| 2007/0285602 A1 | 12/2007 | Takeda et al. |
| 2008/0002093 A1 | 1/2008 | Kim |
| 2008/0153377 A1 | 6/2008 | Kobayashi et al. |
| 2009/0128767 A1 | 5/2009 | Suezaki et al. |
| 2009/0162645 A1 | 6/2009 | Matsuhira |
| 2009/0283211 A1 | 11/2009 | Matsuhira |
| 2009/0296033 A1 | 12/2009 | Shinya et al. |
| 2009/0310057 A1 | 12/2009 | Kang et al. |
| 2009/0322983 A1 | 12/2009 | Hashino |
| 2010/0097552 A1 | 4/2010 | Shinya et al. |
| 2010/0097746 A1 | 4/2010 | Toyoda et al. |
| 2010/0294344 A1 | 11/2010 | Huang |
| 2011/0069384 A1 | 3/2011 | Kodama et al. |
| 2011/0265934 A1 | 11/2011 | Oshima et al. |

FOREIGN PATENT DOCUMENTS

| | | |
|---|---|---|
| CN | 1609943 A | 4/2005 |
| CN | 1661447 A | 8/2005 |
| CN | 1788041 A | 6/2006 |
| CN | 1918515 A | 2/2007 |
| CN | 1936663 A | 3/2007 |
| CN | 101681571 B | 3/2013 |
| EP | 0 789 295 A1 | 8/1997 |
| EP | 1 261 011 A2 | 11/2002 |
| EP | 1 283 106 A1 | 2/2003 |
| EP | 1 574 556 A2 | 9/2005 |
| EP | 1 634 910 A1 | 3/2006 |
| EP | 1 739 473 A2 | 1/2007 |
| EP | 1 973 089 A1 | 9/2008 |
| EP | 2 051 227 A1 | 4/2009 |
| EP | 2 133 855 A1 | 12/2009 |
| JP | S60-079388 A | 5/1985 |
| JP | H02-165188 A | 6/1990 |
| JP | H03-204616 A | 9/1991 |

(56) References Cited

FOREIGN PATENT DOCUMENTS

| | | |
|---|---|---|
| JP | 06-088963 A | 3/1994 |
| JP | H06-75701 A | 3/1994 |
| JP | H06-299126 A | 10/1994 |
| JP | H06-337411 A | 12/1994 |
| JP | H07-13173 A | 1/1995 |
| JP | H07-64282 A | 3/1995 |
| JP | H07-114010 A | 5/1995 |
| JP | H08-122759 A | 5/1996 |
| JP | H08-160407 A | 6/1996 |
| JP | H08-211353 A | 8/1996 |
| JP | H08-220554 A | 8/1996 |
| JP | H08-328023 A | 12/1996 |
| JP | H09-087593 A | 3/1997 |
| JP | H09-259770 A | 10/1997 |
| JP | H-09-274536 A | 10/1997 |
| JP | H09-318932 A | 12/1997 |
| JP | H10-081956 A | 3/1998 |
| JP | H10-83247 A | 3/1998 |
| JP | H10-95967 A | 4/1998 |
| JP | H10-168424 A | 6/1998 |
| JP | H10-293314 A | 11/1998 |
| JP | H11-181385 A | 7/1999 |
| JP | 2000-026555 A | 1/2000 |
| JP | 2000-073025 A | 3/2000 |
| JP | 2000-111908 A | 4/2000 |
| JP | 2000-219868 A | 8/2000 |
| JP | 2000-258780 A | 9/2000 |
| JP | 2000-267118 A | 9/2000 |
| JP | 2000-269475 A | 9/2000 |
| JP | 2000-284700 A | 10/2000 |
| JP | 2001-026758 A | 1/2001 |
| JP | 2001026759 A | 1/2001 |
| JP | 2001-037868 A | 2/2001 |
| JP | 2001-141907 A | 5/2001 |
| JP | 2001-290005 A | 10/2001 |
| JP | 3220403 B2 | 10/2001 |
| JP | 2002-019013 A | 1/2002 |
| JP | 2002-040208 A | 2/2002 |
| JP | 2002-052552 A | 2/2002 |
| JP | 2002-092957 A | 3/2002 |
| JP | 2002-108238 A | 4/2002 |
| JP | 2002-258268 A | 9/2002 |
| JP | 2002-528298 A | 9/2002 |
| JP | 3327423 B2 | 9/2002 |
| JP | 2002-309199 A | 10/2002 |
| JP | 2002-323861 A | 11/2002 |
| JP | 2002-341317 A | 11/2002 |
| JP | 2002-341776 A | 11/2002 |
| JP | 2002-348150 A | 12/2002 |
| JP | 2002-543545 A | 12/2002 |
| JP | 2003-003150 A | 1/2003 |
| JP | 2003-029644 A | 1/2003 |
| JP | 2003-096425 A | 4/2003 |
| JP | 2003-150065 A | 5/2003 |
| JP | 2003-207790 A | 7/2003 |
| JP | 2003-295780 A | 10/2003 |
| JP | 2004-009665 A | 1/2004 |
| JP | 2004-029711 A | 1/2004 |
| JP | 2004-061925 A | 2/2004 |
| JP | 2004-069925 A | 3/2004 |
| JP | 2004-077887 A | 3/2004 |
| JP | 2004-115757 A | 4/2004 |
| JP | 2004-117545 A | 4/2004 |
| JP | 2004-169023 A | 6/2004 |
| JP | 2004-170907 A | 6/2004 |
| JP | 2004-212521 A | 7/2004 |
| JP | 2004-224855 A | 8/2004 |
| JP | 2004-256595 A | 9/2004 |
| JP | 2004-271935 A | 9/2004 |
| JP | 2004-272059 A | 9/2004 |
| JP | 2004-279946 A | 10/2004 |
| JP | 2004-325788 A | 11/2004 |
| JP | 2004-359769 A | 12/2004 |
| JP | 2005-023315 A | 1/2005 |
| JP | 2005-055641 A | 3/2005 |
| JP | 2005-076017 A | 3/2005 |
| JP | 2005-154581 A | 6/2005 |
| JP | 2005-179481 A | 7/2005 |
| JP | 2005-189571 A | 7/2005 |
| JP | 2005-225127 A | 8/2005 |
| JP | 2005-234129 A | 9/2005 |
| JP | 2005-283749 A | 10/2005 |
| JP | 2005-314687 A | 11/2005 |
| JP | 2005-315901 A | 11/2005 |
| JP | 2006-011212 A | 1/2006 |
| JP | 2006-047741 A | 2/2006 |
| JP | 2006-053425 A | 2/2006 |
| JP | 2006-053531 A | 2/2006 |
| JP | 2006-058753 A | 3/2006 |
| JP | 2006-106503 A | 4/2006 |
| JP | 2006-113435 A | 4/2006 |
| JP | 2006-129678 A | 5/2006 |
| JP | 2006-137795 A | 6/2006 |
| JP | 2006-150755 A | 6/2006 |
| JP | 2006-154758 A | 6/2006 |
| JP | 2006-159412 A | 6/2006 |
| JP | 2006-189715 A | 7/2006 |
| JP | 2006-193730 A | 7/2006 |
| JP | 2006-221187 A | 8/2006 |
| JP | 2006-267502 A | 10/2006 |
| JP | 2006-276105 A | 10/2006 |
| JP | 2006-277828 A | 10/2006 |
| JP | 2006-282911 A | 10/2006 |
| JP | 2006-292993 A | 10/2006 |
| JP | 2006-298964 A | 11/2006 |
| JP | 2006-308866 A | 11/2006 |
| JP | 2006-342222 A | 12/2006 |
| JP | 2006-349736 A | 12/2006 |
| JP | 2007-009115 A | 1/2007 |
| JP | 2007-010769 A | 1/2007 |
| JP | 2007-023147 A | 2/2007 |
| JP | 2007-041534 A | 2/2007 |
| JP | 2007-047621 A | 2/2007 |
| JP | 2007-077321 A | 3/2007 |
| JP | 2007-086290 A | 4/2007 |
| JP | 2007-102251 A | 4/2007 |
| JP | 2007-102252 A | 4/2007 |
| JP | 2007-108592 A | 4/2007 |
| JP | 2007-114737 A | 5/2007 |
| JP | 2007-140220 A | 6/2007 |
| JP | 2007-156066 A | 6/2007 |
| JP | 2007-178758 A | 7/2007 |
| JP | 2007-186360 A | 7/2007 |
| JP | 2007-249038 A | 9/2007 |
| JP | 2007-298667 A | 11/2007 |
| JP | 2007293324 A | 11/2007 |
| JP | 2008-005027 A | 1/2008 |
| JP | 2008019402 A | 1/2008 |
| JP | 2008-507617 A | 3/2008 |
| JP | 2008-129159 A | 6/2008 |
| JP | 2009-075490 A | 4/2009 |
| JP | 2009-274536 A | 11/2009 |
| JP | 2015-163991 A | 9/2015 |
| JP | 2015-187742 A | 10/2015 |
| KR | 2002-0030852 A | 4/2002 |
| KR | 10-2005-0067162 A | 6/2005 |
| KR | 10-2007-0033920 A | 3/2007 |
| TW | 482913 B | 4/2002 |
| TW | 567338 B | 12/2003 |
| TW | 2004-22708 A | 11/2004 |
| TW | 2007-04704 A | 2/2007 |
| TW | 2007-10155 A | 3/2007 |
| TW | 200903084 A | 1/2009 |
| TW | I395011 B | 5/2013 |
| WO | 00/65409 A2 | 11/2000 |
| WO | 01/87595 A1 | 11/2001 |
| WO | 2006/011461 A1 | 2/2006 |
| WO | 2006/049296 A1 | 5/2006 |
| WO | 2006/100788 A1 | 9/2006 |
| WO | 2006/121174 A1 | 11/2006 |
| WO | 2006/129665 A1 | 12/2006 |
| WO | 2006/129678 A1 | 12/2006 |

(56) References Cited

FOREIGN PATENT DOCUMENTS

| WO | 2007/063751 A1 | 6/2007 |
|----|----------------|--------|
| WO | 2007/066590 A1 | 6/2007 |
| WO | 2008/007800 A1 | 1/2008 |

OTHER PUBLICATIONS

Oct. 6, 2015 Office Action issued in European Application No. 11 009 604.7.
Dec. 5, 2016 Search Report issued in European Patent Application No. 16001361.1.
Mar. 22, 2010 Search Report issued in European Patent Application No. 07790882.0.
Apr. 5, 2012 Office Action issued in European Patent Application No. 07 790 882.0.
Apr. 27, 2012 Office Action issued in Chinese Patent Application No. 201110086455.6.
Mar. 21, 2012 Office Action issued in Japanese Patent Application No. 2008-185415 (with English translation).
Oct. 25, 2012 Notification of Reasons for Refusal issued in Japanese Patent Application No. H10-240922.
Dec. 25, 2012 Office Action issued in Chinese Patent Application No. 201110086455.6.
Aug. 26, 2014 Office Action issued in U.S. Appl. No. 12/308,858.
Aug. 4, 2014 Office Action issued in Taiwanese Patent Application No. 102118596 (with English translation).
May 10, 2017 Summons to Attend Oral Proceedings issued in European Application No. 08778217.3.
May 11, 2017 Summons to Attend Oral Proceedings issued in European Application No. 11009604.7.
Jun. 22, 2017 Office Action Issued In U.S. Appl. No. 15/415,386.
Jun. 2, 2017 Office Action issued in European Patent Application No. 08 740 108.9.
Aug. 20, 2020 Office Action issued U.S. Appl. No. 16/868,012.
May 18, 2021 Office Action issued in Japanese Patent Application No. 2018-223551.
Dec. 12, 2014 Extended European Search Report issued in European Application No. 14002672.5.
Jan. 2, 2015 Office Action issued in U.S. Appl. No. 12/450,325.
Jun. 6, 2014 Office Action issued in U.S. Appl. No. 12/450,325.
Jul. 1, 2014 Notification of Reason(s) for Refusal issued in Japanese Patent Application No. 2008-100891 with English-language translation.
Feb. 14, 2014 Office Action issued in Korean Patent Application No. 10-2009-7021086.
Feb. 8, 2014 Office Action issued in Chinese Patent Application No. 200880011250.8.
Nov. 8, 2013 Office Action issued in U.S. Appl. No. 12/450,263.
May 15, 2013 Office Action issued in U.S. Appl. No. 12/450,108.
Jul. 29, 2013 Office Action issued in U.S. Appl. No. 12/450,325.
Apr. 2, 2013 Office Action issued in U.S. Appl. No. 12/450,325.
Apr. 9, 2013 Office Action issued in U.S. Appl. No. 12/450,263.
Mar. 2, 2009 International Preliminary Report on Patentability issued in International Patent Application No. PCT/JP2008/056996.
Jun. 25, 2010 Extended European Search Report issued in European Patent Application No. 08740099.0.
Sep. 16, 2010 Office Action issued in U.S. Appl. No. 12/450,192.
Jun. 10, 2008 International Search Report issued in International Patent Application No. PCT/JP2008/056818.
Mar. 19, 2010 European Extended Search Report issued in European Patent Application No. 08739924.2.
Jun. 10, 2008 International Search Report issued in International Patent Application No. PCT/JP2008/056601.
Jun. 7, 2010 Extended European Search Report issued in European Patent Application No. 08740127.9.
May 25, 2012 Office Action issued in U.S. Appl. No. 12/450,325.
Jul. 11, 2012 Office Action issued in European Patent Application No. 08 740 099.0.
Jul. 1, 2008 International Search Report issued in International Patent Application No. PCT/JP2008/056996.
Apr. 26, 2011 Extended European Search Report issued in European Patent Application No. 11000219.3.
Jul. 9, 2012 Office Action issued in European Patent Application No. 08740171.7.
Jul. 9, 2012 Office Action issued in European Patent Application No. 11000219.3.
Sep. 6, 2012 Office Action issued in U.S. Appl. No. 12/450,263.
Oct. 9, 2012 Office Action issued in U.S. Appl. No. 12/450,108.
Jul. 31, 2012 Office Action issued in European Patent Application No. 08 740 108.9.
Mar. 22, 2010 Extended European Search Report issued in European Patent Application No. 08740108.9.
Aug. 7, 2009 International Preliminary Report on Patentability issued in International Patent Application No. PCT/JP2008/057005.
Jul. 9, 2012 Office Action issued in European Patent Application No. 08 740 127.9.
May 25, 2011 Office Action issued in Chinese Patent Application No. 200880011341.1.
Feb. 26, 2016 Office Action issued in Korean Patent Application No. 2015-7001682.
Jul. 15, 2016 Office Action issued in U.S. Appl. No. 14/721,748.
Dec. 13, 2016 Office Action issued in U.S. Appl. No. 12/450,325.
Jun. 10, 2024 Extended European Search Report issued in European Patent Application No. 24162999.7.
May 10, 2017 Summons to Attend Oral Proceedings issued in European Patent Application No. 08778217.3.
Jul. 5, 2017 Office Action issued in U.S. Appl. No. 12/450,325.
Aug. 22, 2017 Office Action issued in U.S. Appl. No. 14/721,748.
Jun. 22, 2018 Office Action issued in U.S. Appl. No. 14/721,748.
Jul. 20, 2018 Office Action issued in U.S. Appl. No. 12/450,325.
Jul. 27, 2018 Extended European Search Report issued in European Patent Application No. 18179069.2.
Mar. 29, 2019 extended European Search Report issued in European Patent Application No. 18210664.01.
Jun. 3, 2019 Office Action issued in U.S. Appl. No. 12/450,325.
Oct. 2, 2019 Office Action issued in U.S. Appl. No. 16/216,525.
Jan. 28, 2020 Office Action issued in U.S. Appl. No. 12/450,325.
Aug. 19, 2020 Notice of Allowance issued in U.S. Appl. No. 12/450,325.
Jun. 22, 2010 Extended European Search Report issued in European Patent Application No. 08778217.3.
May 27, 2021 Office Action issued in U.S. Appl. No. 16/909,943.
Jun. 29, 2021 Office Action issued in U.S. Appl. No. 16/952,929.
Apr. 14, 2022 Office Action issued in U.S. Appl. No. 16/952,929.
Jan. 25, 2021 Office Action issued in European Patent Application No. 18 210 664.1.
Oct. 5, 2015 Office Action issued in European Application No. 08 778 217.3.
Oct. 12, 2015 Office Action issued in European Application No. 08740099.0.
Jun. 7, 2010 Extended European Search Report issued in European Patent Application No. 08740171.7.
Mar. 30, 2012 Office Action issued U.S. Appl. No. 12/452,329.
Jul. 20, 2015 Communication issued in European Patent Application No. 08 740 108.9.
Jul. 18, 2012 Extended European Search Report issued in European Patent Application No. 11009604.7.
Jun. 30, 2010 Extended European Search Report issued in European Patent Application No. 08791186.3.
Jun. 11, 2009 International Preliminary Report on Patentability issued in International Patent Application No. PCT/JP2008/062791.
Aug. 19, 2008 International Search Report received in International Patent Application No. PCT/JP2008/062866.
May 9, 2014 Office Action issued in Korean Patent Application No. 10-2014-7003818.
Apr. 1, 2014 Decision of Refusal issued in Japanese Patent Application No. 2008-101101 (with translation).
Oct. 21, 2013 Office Action issued in Chinese Patent Application No. 201110129612.7.
Nov. 12, 2013 Office Action issued in Japanese Patent Application No. 2008-101101.

(56) References Cited

OTHER PUBLICATIONS

Dec. 13, 2011 Submission of Publications and the like for Japanese Application No. 2008-105198 with English-language translation.
Jun. 2, 2017 Office Action issued in European Application No. 08 740 108.9.
Aug. 20, 2013 Korean Office Action issued in Application No. 10-2009-7000633 (with English translation).
Aug. 28, 2018 Office Action issued in Japanese Application No. 2016-246431.
Mar. 17, 2010 Extended European Search Report issued in European Patent Application No. 08739711.3.
Sep. 11, 2009 U.S. Appl. No. 12/450,232 filed under the name of Shinya et al.
Aug. 6, 2015 Office Action issued in U.S. Appl. No. 12/450,325.
Aug. 20, 2013 Submission of Publications and the like issued in Japanese Patent Application No. 2008-101101 (with English translation).
Jun. 13, 2017 Office Action issued in Japanese Patent Application No. 2016-128496.
Jan. 24, 2014 Office Action issued in Chinese Patent Application No. 201110242574.6.
Aug. 24, 2015 Decision on Appeal of Final Rejection issued issued in Korean Patent Application No. 10-2009-7021192.
Sep. 1, 2015 Office Action issued in Taiwanese Patent Application No. 101130952.
May 11, 2016 Third Party Submission issued in Japanese Application No. 2015-161711.
May 11, 2016 Third Party Submission of Publications Issued in Japanese Application No. 2015-161711.
Jul. 5, 2016 Office Action issued in Japanese Patent Application No. 2015-161711.
Mar. 21, 2017 Notification of Reason(s) for Refusal issued in Japanese Patent Application No. 2016-128495.
Jul. 13, 2012 Office Action issued in Korean Patent Application No. 10-2012-7007367.
Jan. 13, 2012 Submission of Publications and the like for Japanese Patent Application No. 2008-098342 (with translation).
May 11, 2011 Office Action issued in Chinese Patent Application No. 200880024844.2.
May 11, 2012 Office Action issued in Taiwanese Patent Application No. 97127146.
Apr. 5, 2012 Office Action issued in Chinese Patent Application No. 200880024815.6.
May 21, 2015 Office Action issued in Taiwanese Patent Application No. 103112478.
Jun. 3, 2015 Office Action issued in Chinese Patent Application No. 2013-10578940.4.
Oct. 3, 2011 Japanese Submission of Publications of and the like issued in Japanese Patent Application No. JP-2008-098342 (with Translation).
Mar. 28, 2012 Japanese Office Action issued in Japanese Patent Application No. 2008-096150 (with English translation).
Aug. 31, 2012 Office Action issued in Korean Patent Application No. 10-2010-7000882.
Mar. 29, 2013 Office Action issued in Korean Patent Application No. 10-2010-7000882.
Mar. 22, 2011 Office Action issued in Chinese Patent Application No. 200880011250.8.
Dec. 24, 2014 Notification of Reason(s) for Refusal issued in Japanese Patent Application No. 2014-022038.
Jun. 20, 2012 Office Action issued in Japanese Patent Application No. 2008-098342 (with translation).
The Committee of Kagaku Daijiten, eds., "Kagaku Daijiten 2", p. 375, Kyoritsu Shuppan Co., Lid., Jul. 15, 2006; Akira Matsumura, ed., "Daijirin", p. 449, Sanseido Publishing Co., Lid., Nov. 3, 1988; and the Committee of Shogakukan Daijisen, eds., "Daijisen", p. 492, Shogakukan Inc., Dec. 1, 1995 (documents on visible light).
Oct. 13, 2020 Office Action issued in Japanese Patent Application No. 2019-104424.
Liquefied Polyisoprene Rubber LIR, May 12, 2002.
Aug. 14, 2012 Office Action issued in Taiwanese Patent Application No. 97112940.
Mar. 25, 2019 Office Action issued in Korean Application No. 10-2018-7018731.
Aug. 16, 2012 Office Action issued in Taiwanese Patent Application No. 97112942.
May 30, 2013 Office Action issued in Korean Patent Application No. 10-2012-7007367.
Sep. 13, 2016 Office Action issued in U.S. Appl. No. 14/331,660.
Feb. 29, 2012 Notification of Reason(s) for Refusal for Japanese Patent Application No. 2008-105198 (with translation).
Feb. 20, 2012 Submission of Publications and the like issued in Japanese Patent Application No. 2008-100891 (with translation).
Office Action issued in Taiwanese Patent Application No. 97101357 (with English translation).
Oct. 23, 2012 Japanese Submission of Publications and the Like issued in Japanese Patent Application No. 2008-098342 (with English Translation).
Nov. 21, 2012 Submission of Publications and the Like issued in Japanese Patent Application No. 2008-100891 (with English translation).
Notifications of reasons for refusal dated Aug. 6, 2008 (drafting date) and Dec. 26, 2008 (drafting date), decision of refusal dated May 18, 2009 (drafting date), and Preliminary report dated Oct. 16, 2009 (Creation date), of Japanese Patent Application No. Hei. 11-038529 (with English translation).
Oct. 19, 2011 Chinese Office Action issued in Chinese Patent Application No. 200780026330.6 (with English-Language Translation).
Nov. 17, 2015 Office Action issued in U.S. Appl. No. 12/308,858.
Mar. 26, 2015 Office Action issued in U.S. Appl. No. 12/308,858.
Sep. 19, 2007 Written Opinion of the International Preliminary Examining Authority for International Application No. PCT/JP2007/064120 (with translation).
Nov. 6, 2013 Office Action issued in Japanese Patent Application No. 2008-101101 (with English translation).
U.S. Appl. No. 15/415,386, filed Jan. 25, 2017 in the name of Shinya et al.
Nov. 5, 2019 Office Action issued in Japanese Patent Application No. 2018-223551.
Oct. 25, 2012 Submission of Publications and the Like issued in Japanese Patent Application No. 2008-105198 (with English translation).
Feb. 25, 2016 Office Action issued in U.S. Appl. No. 12/450,325.
May 10, 2022 Office Action issued in Japanese Patent Application No. 2021-118142.
May 20, 2008 Office Action issued in Japanese Patent Application No. H10-240922.
Nov. 30, 2012 Office Action issued in Chinese Patent Application No. 200880024815.6.
Sep. 20, 2012 Office Action issued in Taiwanese Patent Application No. 097127147.
Feb. 24, 2012 Office Action issued in Taiwanese Patent Application No. 097127147.
Oct. 21, 2011 Office Action issued in Korean Patent Application No. 10-2010-7000882.
Jan. 27, 2006 Decision on Opposition issued in Japanese Patent No. 3327423.
May 15, 2013 Office Action issued in Chinese Patent Application No. 201110242574.6.
May 24, 2013 Office Action issued in Chinese Patent Application No. 200880024815.6.
Apr. 11, 2012 Office Action issued in Chinese Patent Application No. 200880011341.1.
Feb. 24, 2012 Office Action issued in Taiwanese Patent Application No. 097112938.
Sep. 16, 2021 Notice of Allowance issued in U.S. Appl. No. 16/909,943.
Oct. 18, 2013 Notice of Grounds for Rejection issued in Korean Application No. 2013-7020373.
Feb. 26, 2015 Office Action issued in U.S. Appl. No. 14/331,660.
Feb. 15, 2015 Office Action issued in Chinese Patent Application No. 201310056745.5.

(56) References Cited

OTHER PUBLICATIONS

Mar. 21, 2013 Office Action issued in Chinese Patent Application No. 200880011250.8.
Mar. 8, 2013 Office Action issued in Taiwanese Patent Application No. 97112939.
Jan. 4, 2012 Submission of Publications and the like issued in Japanese Patent Application No. 2008-101101.
Aug. 16, 2012 Office Action issued in Taiwanese Patent Application No. 097112939.
Jun. 18, 2012 Office Action issued in Chinese Patent Application No. 200880011250.8.
Dec. 6, 2012 Office Action issued in Chinese Patent Application No. 201110129612.7.
Dec. 21, 2012 Office Action issued in Chinese Patent Application No. 200880011341.1.
"Trial Decision" of Japanese Patent Application No. HE1 11-38529 (Dissatisfaction No. 2009-14917) (with English translation).
Mar. 28, 2012 Office Action issued in Japanese Patent Application No. 2008-096150 (with English translation).
Mar. 28, 2012 Office Action issued in Japanese Patent Application No. 2012-048220.
Apr. 9, 2007 Japanese Patent Application No. 2007-102251.
Jul. 14, 2006 Japanese Patent Application No. 2006-193730.
Jan. 11, 2008 Japanese Patent Application No. 2008-005027.
Jul. 17, 2007 Japanese Patent Application No. 2007-186360.
Apr. 9, 2007 Japanese Patent Application No. 2007-102252.
Dec. 30, 2011 Submission of Publications and the Like issued in Japanese Patent Application No. 2008-101101 with English-language translation.
WIPO Patentscope for WO 2008/007800.
Dec. 30, 2011 Submission of Publications and the Like issued in Japanese Patent Application No. 2008-100891 wit English-language translation.
Nov. 23, 2011 Office Action issued in Chinese Patent Application No. 200880011250.8.
Mar. 21, 2012 Office Action issued in Japanese Patent Application No. 2008-185415 (with English-language translation).
May 9, 2011 Japanese Submission of Publications and the like for Application No. 2008-105198 wl English translation.
Jul. 6, 2011 Japanese Submission of Publications and the like for Japanese Patent Application No. 2008-98342 (with Translation).
Jul. 11, 2011 Japanese Submission of Publications and the like for Japanese Patent Application No. 2008-105198 (with Translation).
Jun. 4, 2015 Office Action issued in Korean Patent Application No. 2015-7008267.
Jul. 13, 2015 Office Action issued in Taiwanese Patent Application No. 102112670.
Aug. 24, 2015 Office Action issued in Korean Patent Application No. 2009-7021192.
Oct. 27, 2015 Office Action issued in Chinese Patent Application No. 201310056745.5.
Oct. 22, 2015 Office Action issued in Chinese Patent Application No. 201410025812.1.
Jan. 15, 2016 Office Action issued in Chinese Patent Application No. 201310328607.8.
Jan. 20, 2016 Office Action issued in Chinese Application No. 201310578940.4.
Mar. 1, 2016 Office Action issued in Japanese Patent Application No. 2015-104305.
Mar. 1, 2016 Office Action issued in Japanese Patent Application No. 2015-104375.
Mar. 15, 2016 Office Action issued in Japanese Patent Application No. 2015-112377.
Apr. 21, 2016 Office Action issued in Chinese Patent Application No. 2013-10103458.5.
Apr. 5, 2016 Office Action issued in Japanese Patent Application No. 2015-129846.
Jun. 28, 2016 Office Action issued in Japanese Patent Application No. 2015-161711.
Jul. 28, 2016 Office Action issued in Chinese Application No. 201410025812.1.
Aug. 30, 2016 Office Action issued in Japanese Patent Application No. 2015-251710.
Nov. 18, 2016 Office Action issued in European Patent Application No. 08740127.9.
Jan. 3, 2017 Office Action issued in Chinese Patent Application No. 201310103458.5.
Jan. 19, 2017 Office Action issued in Chinese Patent Application No. 201410025812.1.
Mar. 13, 2017 Notification of Reasons for Refusal issued in Japanese Application No. 2016-128495.
Mar. 15, 2017 Decision of Refusal issued in Japanese Application No. 2015-161711.
Jun. 7, 2017 Notification of Reasons for Refusal issued in Japanese Application No. 2016-128496.
Aug. 18, 2017 Office Action issued in Chinese Application No. 201510002749.4.
Dec. 29, 2017 Office Action issued in U.S. Appl. No. 14/721,748.
Mar. 20, 2018 Office Action issued in Japanese Application No. 2017-121431.
May 29, 2018 Office Action issued in Korean Application No. 10-2017-7016187.
Sep. 12, 2018 Office Action issued in Korean Patent Application No. 10-2018-7018731.
Jul. 31, 2018 Office Action issued in Chinese Application No. 201610359328.1.
Nov. 16, 2018 Office Action issued in Korean Application No. 2016-7017497.
Mar. 8, 2019 Office Action issued in Chinese Patent Application No. 2016/10359328.1.
Jul. 1, 2019 Office Action issued in Korean Patent Application No. 10-2016-7017497.
Sep. 16, 2019 Office Action issued in Chinese Patent Application No. 201610359328.1.
Feb. 18, 2020 Office Action issued in Japanese Patent Application No. 2019-104424.
Sep. 3, 2020 Office Action issued in Japanese Patent Application No. 2018-223551.
Mar. 12, 2021 Office Action issused in Korean Patent Application No. 10-2020-7033926.
Aug. 28, 2018 Office Action issued in Japanese Patent Application No. 2016-246431.
Dec. 27, 2019 Office Action issued in U.S. Appl. No. 15/857,018.
Jun. 14, 2019 Office Action issued in U.S. Appl. No. 15/857,018.
Office Action issued in Chinese Application No. 201110086455.6 dated Apr. 27, 2012 (with translation).
Apr. 8, 2014 Submission of Publications and the like issued in Japanese Patent Application No. 2013-215621 (with English translation).
Apr. 19, 2024 Office Action issued in U.S. Appl. No. 18/224,329.
Jun. 4, 2009 International Preliminary Report on Patentability issued in International Patent Application No. PCT/JP2008/057024.
Aug. 5, 2015 Office Action issued in Chinese Patent Application No. 201310103458.5.
Mar. 23, 2011 Office Action issued in Chinese Patent Application No. 200880019222.0.
Apr. 12, 2012 Office Action issued in Chinese Patent Application No. 200880019222.0.
Dec. 16, 2013 Notice of Grounds for Rejection issued in Korean Application No. 2009-7020498.
Jan. 2, 2014 Office Action issued in Korean Patent Application No. 2013-7026158 (with English translation).
Oct. 25, 2012 Notification of Reasons for Refusal issued in Japanese Patent Application No. Hei 10-240922 (with English translation).
Mar. 23, 2011 Notification of Reason(s) for Refusal for Japanese Patent Application No. 2008-105198 w/ English Translation.
Feb. 12, 2014 Office Action issued in Japanese Patent Application No. 2013-089503 (with English translation).
U.S. Appl. No. 12/452,329, filed Dec. 24, 2009 in the name of Toyoda et al.
Aug. 28, 2014 Office Action issued in counterpart Korean Patent Application No. 2014-7013283 (with English translation).

(56) References Cited

OTHER PUBLICATIONS

Aug. 27, 2014 Office Action issued in counterpart Korean Patent Application No. 2009-7021086 (with English translation).
Jul. 30, 2014 Office Action issued in counterpart Chinese Patent Application No. 201110129612.7 (with English translation).
Sep. 30, 2014 Notice of Grounds for Rejection issued in Korean Application No. 2009-7020757 with English-language translation.
Jul. 23, 2014 "Submission of Publications and the like" submitted in Japanese Patent Application No. 2013-089503 (with English translation).
Sep. 29, 2014 Notice of Final Rejection issued in Korean Application No. 2009-7020498.
Jul. 23, 2014 "Submission of Publications and the like" submitted in Japanese Patent Application No. 2012-181768 (with English translation).
Jul. 2, 2013 Notification of Reasons for Refusal issued in Japanese Patent Application No. 2008-100891 (with English translation).
Jan. 14, 2014 Office Action issued in Japanese Patent Application No. 2012-181768 (with English translation).
May 9, 2013 Submission of Publications and the Like issued in Japanese Patent Application No. 2008-105198 (with English translation).
Apr. 10, 2013 Notification of Reasons for Refusal issued in Japanese Patent Application No. 2008-101101 (with English translation).
Nov. 6, 2019 Summons to Attend Oral Proceedings issued in European Patent Application No. 16001361.1.
Nov. 28, 2017 Office Action issued in Japanese Application No. 2016-246431.
Apr. 1, 2014 Decision to Dismiss the Amendment issued in Japanese Patent Application No. 2008-101101 (with translation).
Oct. 25, 2022 Notification of Reason(s) for Refusal Issued in Japanese Patent Application No. 2021-118142.
Nov. 16, 2022 Notice of Allowance issued in U.S. Appl. No. 16/952,929.
Nov. 25, 2022 Office Action issued in U.S. Appl. No. 17/552,851.
Nov. 28, 2022 Office Action issued in European Patent Application No. 20216920.7.
Jan. 13, 2023 Office Action issued in Korean Patent Application No. 10-2022-7013745.
Apr. 12, 2023 Notice of Allowance Issued in U.S. Appl. No. 17/552,851.
Mar. 27, 2015 Office Action issued in Taiwanese Patent Application 102112670.
Apr. 2, 2015 Office Action issued in Korean Patent Application No. 2015-7001682.
Feb. 3, 2015 Office Action issued in Taiwanese Application No. 101130952.
Jan. 21, 2015 Submission of Publications and the like issued in Japanese Patent Application No. 2013-215621.
Oct. 28, 2014 Notice of Final Rejection issued in Korean Patent Application No. 2013-7020373.
Nov. 11, 2014 Notification of Reason(s) for Refusal issued in Japanese Patent Application No. 2014-018947.
Jul. 31, 2014 Office Action issued in Taiwanese Patent Application No. 102118596.
Sep. 1, 2014 Office Action issued in counterpart Japanese Application No. 2013-215621 (with English translation).
Sep. 30, 2014 Notification of Reason(s) for Refusal issued in Japanese Patent Application No. 2013-089503.
Sep. 30, 2014 Notification of Reason(s) for Refusal issued in Japanese Patent Application No. 2012-181768.
Jul. 16, 2013 Notification of Reasons for Refusal issued in Japanese Patent Application No. 2012-105372 (with English translation).
Dec. 16, 2013 Office Action issued in Korean Application No. 10-2009-7021093.
May 7, 2013 Office Action issued in Japanese Patent Application No. 2008-100879 (with English translation).
May 7, 2013 Office Action issued in Japanese Patent Application No. 2008-101983 (with English translation).
Feb. 20, 2013 Office Action issued in Japanese Patent Application No. 2008-098342 (with English translation).
May 9, 2013 Office Action issued in Chinese Patent Application No. 200880019222.0.
Jan. 30, 2012 Office Action issued in Chinese Patent Application No. 200880015927.5.
Oct. 22, 2012 Office Action issued in Chinese Patent Application No. 200880019222.0.
Dec. 10, 2012 Submission of Publications and the Like issued in Japanese Patent Application No. 2008-098342 (with English translation).
Dec. 26, 2012 Office Action issued in Japanese Patent Application No. 2012-105372 (with English translation).
Dec. 26, 2012 Office Action issued in Japanese Patent Application No. 2008-105198 (with English translation).

\* cited by examiner

RESIN COMPOSITION AND DISPLAY UNIT

This application is a divisional of application Ser. No. 17/941,847, filed Sep. 9, 2022, which in turn is a continuation of application Ser. No. 17/199,913 filed Mar. 12, 2021, which in turn is a continuation of application Ser. No. 16/868,012 filed May 6, 2020, which in turn is a continuation of application Ser. No. 15/857,018 filed Dec. 28, 2017, which in turn is a division of application Ser. No. 15/415,386 filed Jan. 25, 2017, now U.S. Pat. No. 9,885,900, which in turn is a division of application Ser. No. 14/331,660 filed Jul. 15, 2014, now U.S. Pat. No. 9,599,847, which in turn is a continuation of application Ser. No. 12/308,858 filed Dec. 24, 2008, now U.S. Pat. No. 9,423,638, which is a National Stage Application of PCT/JP2007/064120 filed Jul. 17, 2007, and claims the benefit of Japanese Application Nos. 2006-193730 and 2007-102251 filed Jul. 14, 2006 and Apr. 9, 2007, respectively. The disclosures of the prior applications are hereby incorporated by reference herein in their entirety.

TECHNICAL FIELD

The present invention relates to an image display unit used, for example, in cellular phones. In particular, the invention relates to an image display unit that includes an image display part and a transparent protective part arranged on the image display part, with a cured resin arranged between the image display part and the protective part.

BACKGROUND ART

As this type of display unit, a liquid crystal display unit 101 as shown in FIG. 4 is known. The liquid crystal display unit 101 includes a liquid crystal display panel 102 and a transparent protective part 103 arranged on the liquid crystal display panel 102. The protective part 103 is made of, for example, glass or plastic.

To protect the surface of the liquid crystal display panel 102 and a polarizer (not shown), a spacer 104 is arranged between the liquid crystal display panel 102 and the protective part 103 to form a gap 105 between the liquid crystal display panel 102 and the protective part 103.

However, the gap 105 between the liquid crystal display panel 102 and the protective part 103 scatters light, resulting in decreased contrast and luminance of the display unit. The presence of the gap 105 also makes it difficult to design thinner display units.

To address these problems, it has been proposed to fill the gap between the liquid crystal display panel and the protective part with a resin (see, for example, Patent Document 1). However, the stress generated when the resin cures and shrinks causes the deformation of the liquid crystal display panel, resulting in disrupted orientation of the liquid crystal material and other image defects.

[Patent Document 1] Japanese Patent Application Laid-Open No. 2005-55641.

DISCLOSURE OF THE INVENTION

Problems to be Solved by the Invention

The present invention has been devised in view of the above-described problems associated with prior art. Accordingly, it is an object of the present invention to provide a thin display unit that incorporates a high-luminance, high-contrast image display part that is free of image defects caused by the deformation of the display part.

Means for Solving the Problems

In an effort to achieve the foregoing object, the present inventors drew attention to the fact that the internal stress that builds up within a resin as the resin cures can be approximated by the product of the storage modulus and the cure shrinkage of the cured resin, and found an ideal resin composition for filling the above-described gap between the display part and the protective part of a display unit, that is, a resin composition that shrinks little when cured and has a storage modulus in a suitable range. This finding ultimately led to the present invention.

The present invention devised based on the above-described finding provides an image display unit that includes an image display part, a light-transmitting protective part arranged on the image display part, and a cured resin layer arranged between the image display part and the protective part. The cured resin layer has a transmittance of 90% or higher in the visible range and a storage modulus at 25° C. of $1 \times 10^7$ Pa or less.

The present invention also provides the cured resin layer arranged between the image display part and the light-transmitting protective part of the image display unit. As described above, the cured resin layer has a transmittance of 90% or higher in the visible range and a storage modulus at 25° C. of $1 \times 10^7$ Pa or less.

The present invention further provides a resin composition for forming the above-described cured resin layer. The resin composition has a cure shrinkage of 5% or less and its cured resin has a transmittance of 90% or higher in the visible range when formed into a 100 μm-thick layer. The cured resin also has a storage modulus at 25° C. of $1 \times 10^7$ Pa or less.

In the present invention, the image display part may be a liquid crystal display panel.

In the present invention, the protective part may be formed of an acrylic resin.

In the present invention, the protective part may also be formed of an optical glass.

Effect of the Invention

The resin composition of the present invention generates minimum shrinkage stress when it is applied between the image display part and the protective part and cured, so that the effects of the stress on the image display part and the protective part can be minimized. Thus, the image display part and the protective part of the image display unit of the present invention are substantially free of distortion.

Since the cured product of the resin composition of the present invention, namely the cured resin, has a refractive index closer to that of the panels used to make the image display part and the protective part, than does the gap between the liquid crystal display panel and the protective part, light reflection is suppressed at the interface between the protective part and the cured resin or at the interface between the cured resin and the image display part.

As a result, the image display unit of the present invention achieves high-luminance, high-contrast display of images without causing any image defects.

The image display unit of the present invention can effectively prevent the disrupted orientation of liquid crystal materials and other image defects and can therefore achieve high-quality display of images especially when the image display part is a liquid crystal display panel.

Furthermore, the presence of the cured resin between the image display part and the protective part reinforces the image display unit of the present invention, making it resistant to high impacts.

In addition, the present invention can provide image display units that are thinner than any of the conventional image display units that have a gap between the image display part and the protective part.

Figure 1:
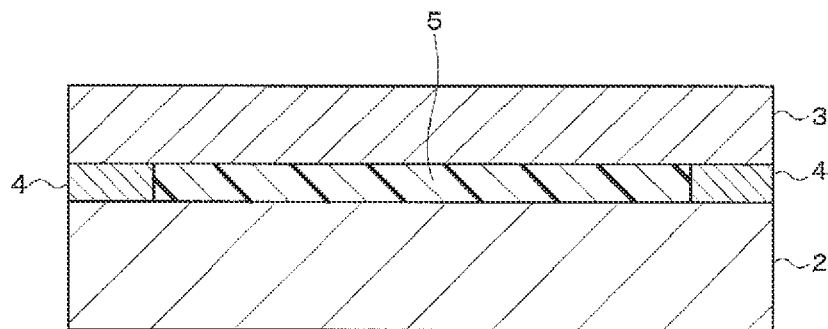
FIG. 1 is a cross-sectional view showing essential components of one embodiment of display unit according to the present invention.

DESCRIPTION OF REFERENCE NUMERALS 1,1B display unit
2 display part
3 protective part
4 spacer
5 cured resin or cured resin layer
6,7 polarizer

BEST MODE FOR CARRYING OUT THE INVENTION

Preferred embodiments of the present invention will now be described with reference to the accompanying drawings, in which the same numerals denote the same or similar elements.

Figure 2:
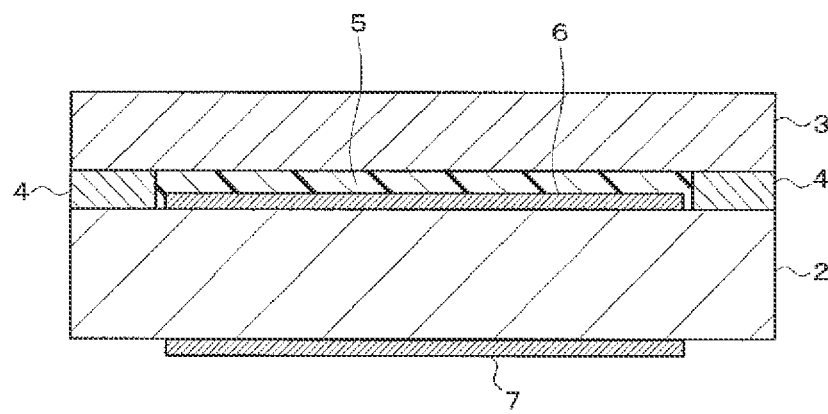
FIG. 2 is a cross-sectional view showing essential components of another embodiment of display unit according to the present invention.

FIGS. 1 and 2 are cross-sectional views each showing one embodiment of display unit according to the present invention.

With reference to FIG. 1, a display unit 1 of the present embodiment includes a display part 2 that is connected to a drive circuit (not shown) and displays predetermined images, and a light-transmitting protective part 3 that is arranged in the vicinity of the display part 2 and faces the display part 2.

In the display unit 1 of the present embodiment, the display part 2 is a liquid crystal display panel used in a liquid display apparatus.

The liquid crystal display apparatus is not limited to a particular type, but can be applied to various systems. Examples of such liquid crystal display apparatuses include those for use in cellular phones, portable game machines and other electronic devices.

When the display part 2 is a liquid crystal display panel, polarizers 6, 7 are arranged on each side of the display part 2 as shown in FIG. 2.

The protective part 3 is formed of a planar member having substantially the same size as the display part 2. The protective part 3 is preferably formed of an optical glass or plastic (such as an acrylic resin).

The protective part 3 is spaced apart from the display part 2 by a spacer 4 arranged along the periphery of the display part 2. The thickness of the spacer is about in the range of from 0.05 mm to 1.5 mm and serves to keep the distance between the surfaces of the display part 2 and the protective part 3 at approximately 1 mm.

The display unit 1 includes a cured resin layer 5 provided between the display part 2 and the protective part 3.

In the present invention, the cured resin layer 5 has a transmittance of 90% or higher in the visible range and a storage modulus at 25° C. of $1.0 \times 10^7$ Pa or less, and preferably from $1.0 \times 10^3$ to $1.0 \times 10^6$ Pa. The resin composition to make the cured resin layer 5 has a cure shrinkage of 5% or less, preferably 4.5% or less, and more preferably from 0 to 2%.

Figure 3:
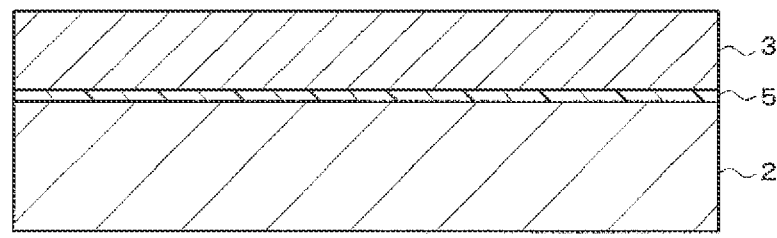
FIG. 3 is a cross-sectional view showing essential components of still another embodiment of display unit according to the present invention.

The image display unit of the present invention is preferably configured without using the spacer 4 used in the above-described embodiments of the display unit 1 shown in FIGS. 1 and 2. Specifically, the resin composition layer 5 and the protective part 3 are sequentially overlaid on the display part 2. Curing the resin composition completes an image display unit 1B as shown in FIG. 3 without providing the spacer. In this configuration, the distance between the display part 2 and the protective part 3 (thus, the thickness of the cured resins layer 5), which is determined by factors such as viscosity and density of the resin composition and weight of the protective part 3, is typically in the range of from 50 μm to 200 μm. Such a configuration therefore makes it possible to design thinner image display units.

In the present invention, the resin composition to make the cured resin layer 5 is preferably a photocurable resin composition in order to increase the productivity, although other resins may also be used.

The resin composition for use in the present invention preferably contains at least one polymer, such as polyurethane acrylates, polyisoprene acrylates and esters thereof, hydrogenated terpene resins or butadiene polymers; at least one acrylate monomer, such as isobornyl acrylate, dicyclopentenyloxyethyl methacrylate or 2-hydroxybutyl methacrylate; and at least one photopolymerization initiator, such as 1-hydroxy-cyclohexyl-phenyl-ketone.

Since the protective part 3 often has a UV-cutting function to protect the display part 2 against ultraviolet rays, the photopolymerization initiator for use in the present invention is preferably used together with a photopolymerization initiator that can cure in the visible range (such as Speed-Cure TPO (trade name for 2,4,6-trimethylbenzoyldiphenylphosphine oxide), Nihon Siber Hegner KK).

The resin composition for use in the present invention is prepared such that the cured resin obtained by curing the resin composition by UV irradiation has a storage modulus (at 25° C.) of $1 \times 10^7$ Pa or less, and preferably in the range of from $1 \times 10^3$ Pa to $1 \times 10^6$ Pa, has a refractive index preferably in the range of from 1.45 to 1.55, and more preferably in the range of from 1.51 to 1.52, and has a transmittance of 90% or higher in the visible range when formed into a 100 μm-thick layer. Different resin compositions containing the same major resin component but different auxiliary resin components and monomer components may be cured to have different storage moduli (at 25° C.) that may, in some cases, exceed $1 \times 10^7$ Pa. Those resin compositions that are cured to have a storage modulus (at 25° C.) of higher than $1 \times 10^7$ Pa are not included in the scope of the present invention.

The resin composition of the present invention also has a preferable cure shrinkage of 5% or less, more preferably of 4.5% or less, and still more preferably in the range of from 0 to 2%. In this manner, the internal stress that builds up within the cured resin upon curing of the resin composition can be reduced, and the distortion generated at the interface between the cured resin layer 5 and the display part 2 or the protective part 3 can be prevented.

Thus, by arranging the resin composition between the display part 2 and the protective part 3 and then curing the resin composition, the amount of light scattered at the interface between the cured resin layer 5 and the display part 2 or the protective part 3 can be reduced. As a result, the luminance and the visibility of the displayed images can be improved.

The magnitude of the internal stress that builds up within the cured resin upon curing of the resin composition can be evaluated by dropping the resin composition onto a flat surface and measuring the average surface roughness of the cured resin. In practice, the distortion generated at the interface between the display part 2 or the protective part 3 and the cured resin arranged in between would be negligible if, for example, a cured resin obtained by dropping 2 mg of the resin composition onto a glass plate and cured by UV irradiation to 90% or a higher cure ratio has an average surface roughness of 6 nm or less. By using the resin composition of the present invention, this average surface roughness can be kept at 6 nm or less, and preferably in the range of 1 nm to 3 nm.

To fabricate the display unit 1 of the present invention, the spacer 4 and a ridge (not shown) are arranged on the display part 2 along its periphery. A predetermined amount of the above-described photocurable resin composition is then poured over the display member 2 in the area inside the spacer and the ridge.

The protective part 3 is then placed on the display part 2 over the spacer 4 and the gap between the display part 2 and the protective part 3 is completely filled with the resin composition.

Subsequently, the resin composition is irradiated with ultraviolet rays via the protective part 3 to cure the resin composition. This completes the desired display unit 1.

When it is desired to fabricate the display unit 1B in which the spacer 4 is omitted, the above-described photocurable resin composition is first applied onto the display part 2. The protective part 3 is then placed over the coating of the resin composition and the ultraviolet rays are irradiated onto the resin composition from the side of the protective part 3.

In the image display units 1, 1B of the present invention obtained in the foregoing manner, the effects of the stress generated as the resin cures and shrinks on the display part 2 and the protective part 3 can be minimized, so that little or no distortion is generated in the display part 2 and the protective part 3. Since the display part 2 is not deformed during the production, it can display images at high luminance and high contrast without causing any image defects.

In addition, the cured resin 5 that fills the gap between the display part 2 and the protective part 3 in the present embodiment reinforces the display unit 1 so that it can withstand high impacts. This makes it possible to design thinner display units 1.

In particular, when the image display part 2 is a liquid crystal display panel, the present invention can provide a liquid crystal display apparatus that can effectively prevent disrupted orientation of liquid crystal materials and other image defects and can thus achieve high-quality display of images especially.

While the present invention is suitable for use in the above-described liquid crystal display apparatuses, the invention is also applicable to various other panel displays, such as organic EL apparatuses and plasma display apparatuses.

EXAMPLES

The present invention will now be described in detail with reference to Examples and Comparative Examples, which are not intended to limit the scope of the invention in any way.

Example 1

The following components were kneaded together in a kneader to make a resin composition of Example 1: 50 parts by weight of polyurethane acrylate, 30 parts by weight of isobornyl acrylate, 3 parts by weight of a photopolymerization initiator and 1 part by weight of a photopolymerization initiator for visible-range.

Example 2

The following components were kneaded together in a kneader to make a resin composition of Example 2: 70 parts by weight of an ester formed from a maleic anhydride adduct of a polyisoprene polymer and 2-hydroxyethyl methacrylate, 30 parts by weight of dicyclopentenyloxyethyl methacrylate, 10 parts by weight of 2-hydroxybutyl methacrylate, 30 parts by weight of a hydrogenated terpene resin, 140 parts by weight of a butadiene polymer, 4 parts by weight of a photopolymerization initiator and 0.5 parts by weight of a visible-range photopolymerization initiator.

Example 3

The following components were kneaded together in a kneader to make a resin composition of Example 3: 100 parts by weight of an ester formed from a maleic anhydride adduct of a polyisoprene polymer and 2-hydroxyethyl methacrylate, 30 parts by weight of dicyclopentenyloxyethyl methacrylate, 10 parts by weight of 2-hydroxybutyl methacrylate, 30 parts by weight of a hydrogenated terpene resin, 210 parts by weight of a butadiene polymer, 7 parts by weight of a photopolymerization initiator and 1.5 parts by weight of a visible-range photopolymerization initiator.

Comparative Example 1

The following components were kneaded together in a kneader to make a resin composition of Comparative Example 1: 50 parts by weight of polybutadiene acrylate, 20 parts by weight of hydroxyethyl methacrylate, 3 parts by weight of a photopolymerization initiator and 1 part by weight of a visible-range photopolymerization initiator.

Comparative Example 2

The following components were kneaded together in a kneader to make a resin composition of Comparative Example 2: 50 parts by weight of polyurethane acrylate, 30 parts by weight of tricyclodecane dimethanol acrylate, 3 parts by weight of a photopolymerization initiator and 1 part by weight of a visible-range photopolymerization initiator.

Comparative Example 3

The following components were kneaded together in a kneader to make a resin composition of Comparative Example 3: 50 parts by weight of polybutadiene acrylate, 20 parts by weight of isobornyl acrylate, 3 parts by weight of a photopolymerization initiator and 1 part by weight of a visible-range photopolymerization initiator.

Evaluation 1

Each of the resin compositions prepared in Examples 1 through 3 and Comparative Examples 1 through 3 was poured onto a 100 μm-thick white glass plate to a predetermined thickness. The plates were transported on a UV-conveyor to obtain cured resins having a predetermined thickness. The cured resins were used as samples.

The light transmittance, elastic modulus, cure shrinkage and surface roughness of each sample were determined as described below.

[Light Transmittance]

Using a UV-Visible spectrophotometer (V-560, Jasco Corp.), each sample (with 100 μm-thick cured resin) was analyzed for the transmittance in the visible range. It turned out that all of the samples had 90% or a higher transmittance.

[Elastic Modulus]

Using a viscoelastometer (DMS6100, Seiko Instruments Inc.), the elastic modulus (at 25° C.) of each sample (with 2 mm-thick cured resin) was measured at a frequency of 1 Hz.

[Cure Shrinkage]

The cure shrinkage of each sample was determined by the following equation using the difference in the specific gravity between the uncured resin solution and the cured solid product, as measured by an electronic specific gravity meter (SD-120L, Mirage Co.).

cure shrinkage (%)={(specific gravity of cured resin−specific gravity of resin solution)/(specific gravity of cured resin)}×100

[Surface Roughness]

Using a three-dimensional non-contact surface roughness meter (Zygo Corp.), each sample (with 1 mm-thick cured resin) was analyzed for the distortion (Ra: average surface roughness) in a predetermined area (2.93 mm×2.20 mm) of the glass plate surface caused by the internal stress generated during UV curing.

These results are shown in Table 1.

TABLE 1

Properties of Examples and Comparative Examples and corresponding evaluation results

| | Elastic modulus (Pa) | Cure shrinkage (%) | Ra: average surface roughness (nm) |
|---|---|---|---|
| Example 1 | $1 \times 10^6$ | 4.5 | 5.5 |
| Example 2 | $1 \times 10^4$ | 1.8 | 2.7 |
| Example 3 | $4 \times 10^3$ | 1.0 | 1.5 |
| Comparative Example 1 | $2 \times 10^7$ | 5.6 | 12.4 |
| Comparative Example 2 | $3 \times 10^8$ | 4.3 | 36.5 |
| Comparative Example 3 | $5 \times 10^8$ | 5.6 | 64.2 |

As can be seen from Table 1, the average surface roughness Ra was from 1.5 nm to 5.5 nm in each of Examples 1 through 3, indicating that samples in these Examples were each distorted little.

In comparison, Ra was significantly large in each of Comparative Example 1 (Ra=12.4 nm), Comparative Example 2 (Ra=36.5 nm) and Comparative Example 3 (Ra=64.2 nm), suggesting that the internal stress generated upon curing of the resin in each of Comparative Examples 1 through 3 caused distortion at the interface between the resin and the glass plate.

Evaluation 2 [Impact Resistance]

The resin composition of Example 1 was cured between a 50 mm×50 mm×0.5 mm glass plate (display part) and a 50 mm×50 mm×0.5 mm polycarbonate plate (protective part) to form a 0.1 mm-thick layer between the two plates. The resulting panel served as the sample panel of Example. In this configuration, the spacer was omitted and the sample panel had a total thickness of 1.1 mm. To fabricate the sample panel, the resin composition of Example 1 was first applied to the glass plate and the polycarbonate plate was placed over the coating of the resin composition. The resin composition was then cured by the irradiation of UV from the side of the polycarbonate plate.

Figure 4:
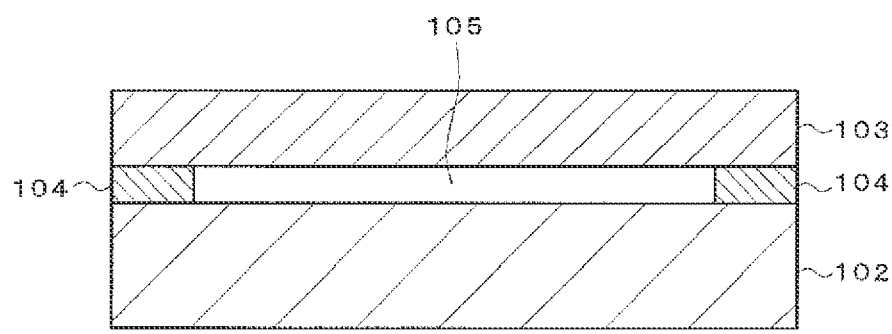
FIG. 4 is a cross-sectional view showing essential components of a conventional display unit.

Meanwhile, a sample panel having the conventional configuration as shown in FIG. 4 was prepared. The liquid crystal display panel (display part) 102 and the protective part 103 used were identical to those used to make the sample panel of Example. The display part and the protective part were assembled with 1.0 mm thick spacers arranged in between to make the sample panel of Comparative Example having a 1.0 mm air gap and a total thickness of 2.0 mm.

Each of the sample panels of Example and Comparative Example was secured to a mount by the periphery using a predetermined jig. A panel breakage test was then performed by perpendicularly pressing a press member, 5 mm in diameter, against the surface of the protective part at a press speed of 1 mm/sec.

The sample panel of Comparative Example with the air gap formed between the display part and the protective part broke at 1 N/cm$^2$, whereas the sample panel of the present invention broke at 1.43 N/cm$^2$.

The results demonstrate that the panel of Example has a press strength that is 43% higher than that of the panel of Comparative Example, yet has a decreased thickness as compared to the panel of Comparative Example.

The invention claimed is:

1. A method of producing an image display unit comprising an image display part, a transparent protective part arranged on the image display part, and a cured resin layer arranged between the image display part and the protective part, the method comprising:
   completely filling a gap between the image display part and the transparent protective part with a resin composition including a photo polymerization initiator that can cure in the visible and ultraviolet ranges, and
   forming the cured resin layer by irradiating the resin composition with ultraviolet rays from the protective part;
   wherein the cured resin layer has:
   (a) a cure ratio of 90% or more;
   (b) a storage modulus at 25° C. of $4.0 \times 10^3$ Pa to $1.0 \times 10^6$ Pa, where the storage modulus value is achieved while the cure ratio becomes 90% or more so as to suppress effects of an internal stress that builds up within the resin composition as the resin composition cures; and
   (c) a transmittance of 90% or more in the visible range.

2. The method according to claim 1, wherein the protective part is formed of an acrylic resin.

3. The method according to claim 1, wherein the protective part is formed of glass.

4. The method according to claim 1, wherein the resin composition further comprises at least one polymer, and at least one acrylate monomer.

5. The method according to claim 1, wherein the resin composition comprises:
   at least one polymer selected from the group consisting of polyurethane acrylates, polyisoprene acrylates and esters thereof, hydrogenated terpene resins, and butadiene polymers; and
   at least one acrylate monomer selected from the group consisting of isobornyl acrylate, dicyclopentenyloxyethyl methacrylate, and 2-hydroxybutyl methacrylate; and the photopolymerization initiator.

* * * * *